United States Patent
Ramoutar et al.

(10) Patent No.: US 9,272,679 B1
(45) Date of Patent: Mar. 1, 2016

(54) BUMPER ASSEMBLY AND SIDE SUPPORT LINKING MEMBERS

(71) Applicant: Toyota Motor Engineering & Manufacturing North America, Inc., Erlanger, KY (US)

(72) Inventors: Naipaul D. Ramoutar, Ann Arbor, MI (US); Mark Kulik, Ann Arbor, MI (US); Manikandan Baby Mony, Saline, MI (US); Jonathan R. Young, Saline, MI (US)

(73) Assignee: Toyota Motor Engineering & Manafacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/665,512

(22) Filed: Mar. 23, 2015

Related U.S. Application Data

(63) Continuation-in-part of application No. 14/516,061, filed on Oct. 16, 2014, now Pat. No. 9,010,845.

(51) Int. Cl.
*B60R 19/00* (2006.01)
*B60R 19/40* (2006.01)
*B60R 19/04* (2006.01)

(52) U.S. Cl.
CPC ................. *B60R 19/40* (2013.01); *B60R 19/04* (2013.01)

(58) Field of Classification Search
CPC ............................... B60R 19/14; B60R 19/40
USPC ........... 296/187.09, 187.1; 293/132, 133, 155
See application file for complete search history.

(56) References Cited

U.S. PATENT DOCUMENTS

| | | |
|---|---|---|
| 6,338,510 B1 | 1/2002 | Kanomori et al. |
| 6,834,899 B2 | 12/2004 | Lindsey |
| 6,957,846 B2 | 10/2005 | Saeki |
| 8,596,711 B2 | 12/2013 | Yasui et al. |
| 8,807,632 B2 | 8/2014 | Ramoutar et al. |
| 2013/0241233 A1 | 9/2013 | Ohnaka et al. |
| 2013/0256051 A1 | 10/2013 | Nakamura et al. |
| 2014/0091585 A1 | 4/2014 | Ramoutar et al. |
| 2014/0091595 A1 | 4/2014 | Ramoutar et al. |

FOREIGN PATENT DOCUMENTS

| | | |
|---|---|---|
| DE | 10240264 | 3/2004 |
| JP | 2009248603 | 10/2009 |

OTHER PUBLICATIONS

Notice of Allowance mailed Dec. 22, 2014 in U.S. Appl. No. 14/516,061.

*Primary Examiner* — Joseph D Pape
(74) *Attorney, Agent, or Firm* — Dinsmore & Shohl LLP

(57) ABSTRACT

Vehicle structures for dissipating energy associated with a collision are described herein. In one embodiment, a vehicle includes a side support extending in a vehicle longitudinal direction, a bumper assembly coupled to the side support and extending in a vehicle lateral direction that is transverse to the vehicle longitudinal direction, and a repositionable joint assembly extending between and pivotally coupled to the side support and the bumper assembly, the repositionable joint assembly including an outboard linking member pivotally coupled to the bumper assembly at a bumper securement location, an inboard linking member pivotally coupled to the side support at a side support securement location, and a fulcrum portion, where the outboard linking member is pivotally coupled to the inboard linking member at the fulcrum portion.

20 Claims, 8 Drawing Sheets

BUMPER ASSEMBLY AND SIDE SUPPORT LINKING MEMBERS

CROSS-REFERENCE TO RELATED APPLICATIONS

The present application is a continuation-in-part of U.S. Non-Provisional patent application Ser. No. 14/516,061, filed on Oct. 16, 2014 and entitled "Bumper Assembly and Side Support Linking Members," the entire disclosure of which is hereby incorporated by reference.

TECHNICAL FIELD

The present disclosure generally relates to vehicles that include structures for transferring and absorbing energy in the event of an impact and, more specifically, to vehicles that include linking members between a bumper assembly and a side support.

BACKGROUND

Vehicles may be equipped with bumper systems and impact protection structures that elastically and plastically deform to absorb energy in the event of a collision. When a vehicle impacts an object that is offset from the centerline of the vehicle such that the object overlaps only a portion of the bumper, the ability of the energy absorbing structures of the vehicle to absorb energy associated with the impact may be reduced. In some impact configurations, the energy absorbing structures of the vehicle may not be activated or may only be partially activated because the object does not come into contact with or only partially comes into contact with associated bumper or vehicle structures. Therefore, the energy absorbing structures of the vehicle may have a reduced effect on the dissipation of the energy of the impact.

In one example, a substantial portion of energy from an impact with a small front bumper overlap may be directed into a bumper assembly at a position that is outboard of energy absorbing structures of the vehicle. Because a substantial portion of the energy from the impact is directed into the bumper assembly at a position that is outboard of many of the energy absorbing structures of the vehicle, the energy from the impact may not be absorbed or may only be partially absorbed by those energy absorbing structures of the vehicle. The unabsorbed energy may be directed rearward along the vehicle structures and toward a cabin of the vehicle.

Accordingly, a need exists for alternative structures for transferring energy and absorbing energy from a small front bumper overlap collision.

SUMMARY

In one embodiment, a vehicle includes a side support extending in a vehicle longitudinal direction, a bumper assembly coupled to the side support and extending in a vehicle lateral direction that is transverse to the vehicle longitudinal direction, and a repositionable joint assembly extending between and pivotally coupled to the side support and the bumper assembly, the repositionable joint assembly including an outboard linking member pivotally coupled to the bumper assembly at a bumper securement location, an inboard linking member pivotally coupled to the side support at a side support securement location, and a fulcrum portion, where the outboard linking member is pivotally coupled to the inboard linking member at the fulcrum portion.

In another embodiment, a vehicle includes a side support extending in a vehicle longitudinal direction, a bumper assembly coupled to the side support and extending in a vehicle lateral direction that is transverse to the vehicle longitudinal direction, and a repositionable joint assembly extending between and pivotally coupled to the side support and the bumper assembly, where the repositionable joint assembly is repositionable between an activated configuration and a deactivated configuration, the repositionable joint assembly including an outboard linking member pivotally coupled to the bumper assembly at a bumper securement location, the outboard linking member including a first engagement surface, an inboard linking member pivotally coupled to the side support at a side support securement location, the inboard linking member including a second engagement surface, and a fulcrum portion, where the outboard linking member is pivotally coupled to the inboard linking member at the fulcrum portion, where a distance between the first engagement surface and the second engagement surface in the deactivated configuration is greater than a distance between the first engagement surface and the second engagement surface in the activated configuration.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Vehicles according to the present disclosure include a side support that extends in a vehicle longitudinal direction and a bumper assembly that is coupled to the side support and extends in a vehicle lateral direction that is transverse to the vehicle longitudinal direction. The vehicles further include a repositionable joint assembly that extends between and is pivotally coupled to the side support and the bumper assembly. The repositionable joint assembly includes an outboard linking member that is pivotally coupled to the bumper assembly at a bumper securement location and an inboard linking member that is pivotally coupled to the side support at a side support securement location. The outboard linking member and the inboard linking member are pivotally coupled to one another at a fulcrum portion. In some embodiments, the bumper securement location is positioned outboard of an inner flange of a rim in the vehicle lateral direction. In some embodiments, the repositionable joint assembly is repositionable between a deactivated configuration and an activated configuration. When moving from the deactivated configuration to the activated configuration, the outboard linking member and the inboard linking member may pivot about the fulcrum portion towards one another such that a distance between a first engagement surface of the outboard linking member and a second engagement surface of the inboard linking member is greater in the deactivated configuration than a distance between the first engagement surface and the second engagement surface in the activated configuration. These and other embodiments will be described in more detail below in reference to the appended drawings.

Figure 1:
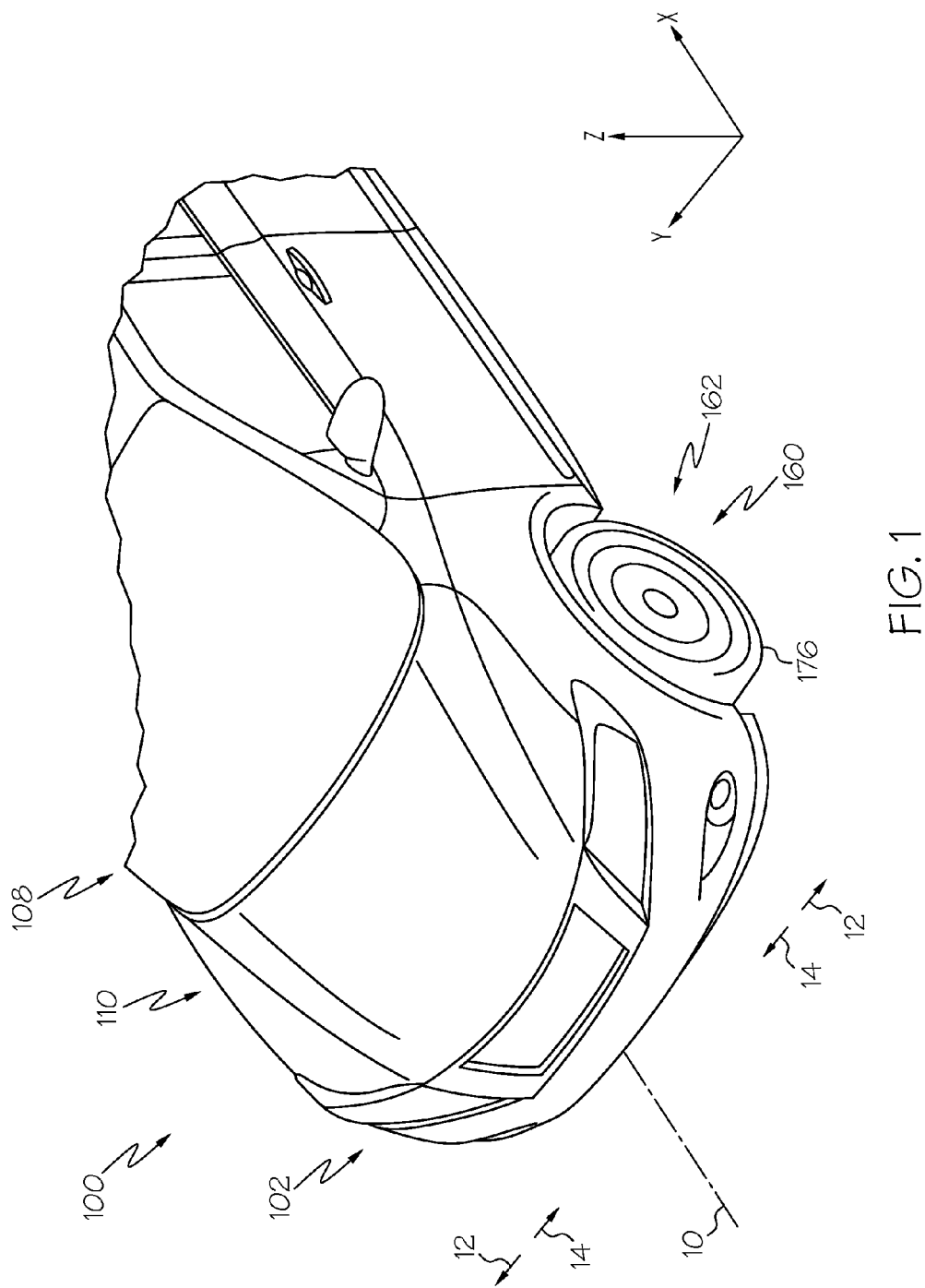
FIG. 1 schematically depicts a perspective view of a vehicle including a bumper according to one or more embodiments shown or described herein.
Figure 2:
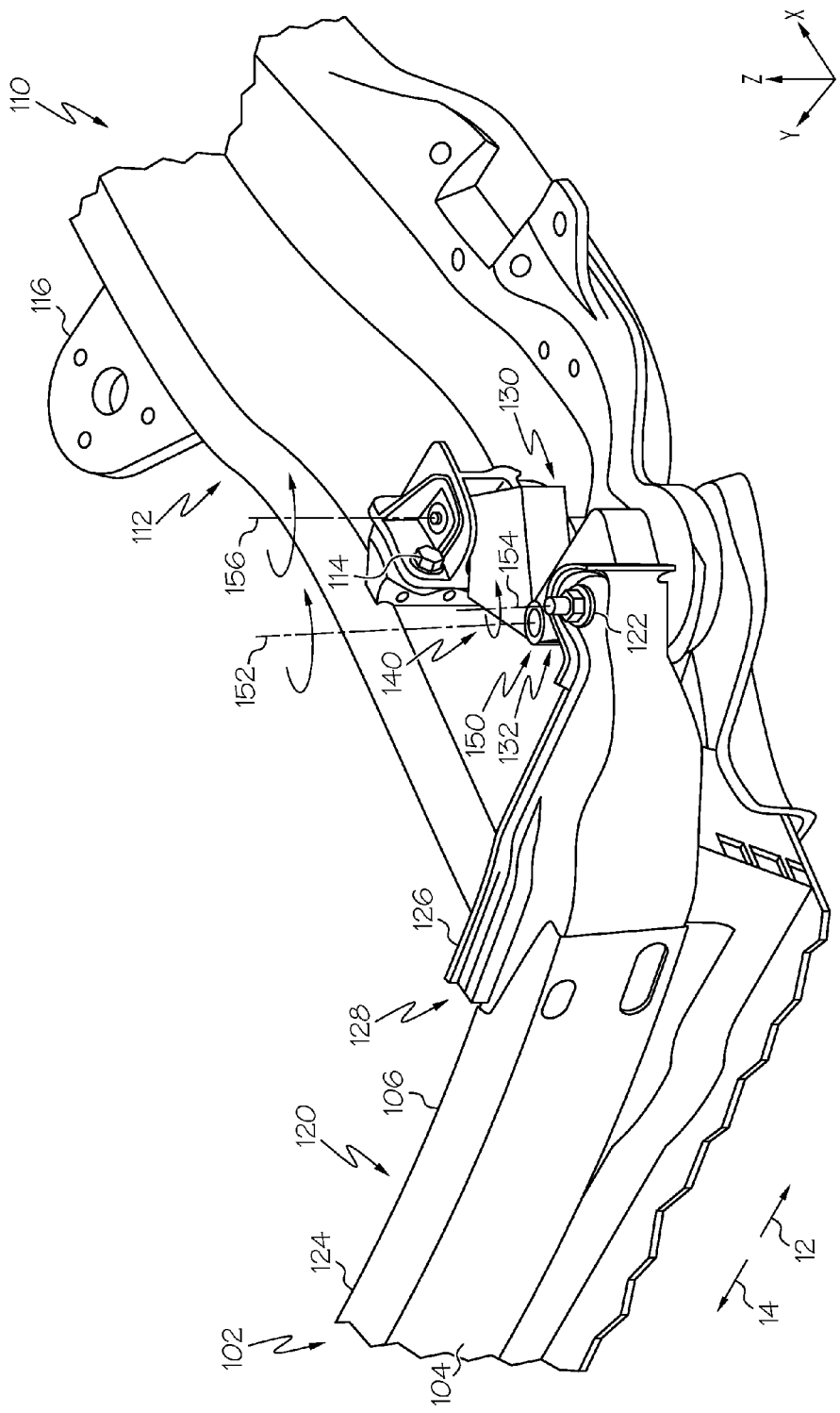
FIG. 2 schematically depicts a perspective view of a bumper assembly, side support, and a repositionable joint assembly according to one or more embodiments shown or described herein.
Figure 3:
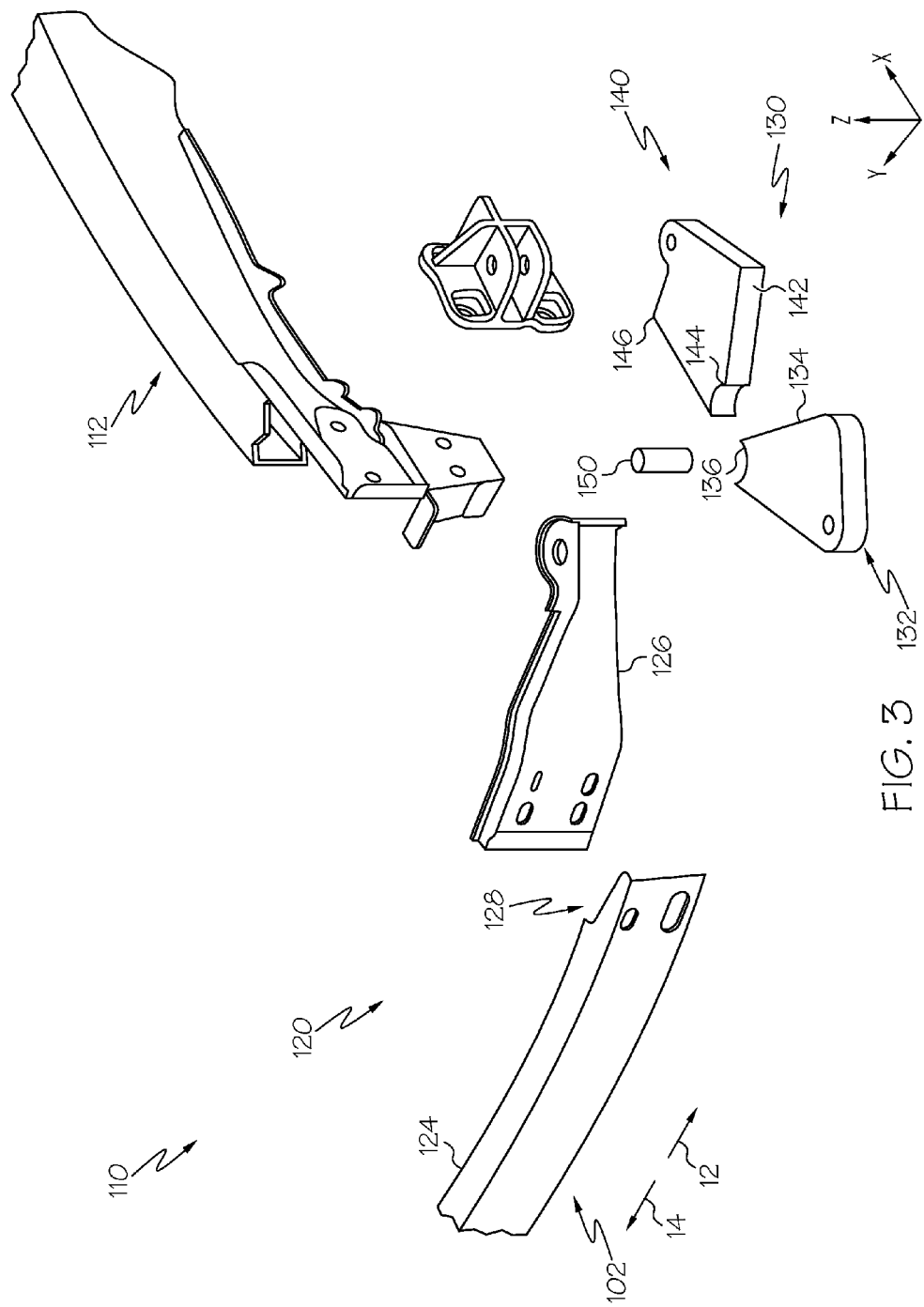
FIG. 3 schematically depicts an exploded perspective view of a bumper assembly, a side support, and a repositionable joint assembly according to one or more embodiments shown or described herein.

Referring initially to FIGS. 1 and 2, a vehicle 100 is depicted with a front bumper 102. The front bumper 102 is positioned in a front portion of the vehicle 100. The vehicle 100 includes a unibody 110 onto which a vehicle drivetrain is coupled. The unibody 110 includes a pair of front suspension mounts 116 to which front suspension units 160 of the vehicle 100 are generally attached. The vehicle 100 also includes a cabin 108 that is integral with the unibody 110. The cabin 108 generally defines a passenger cabin of the vehicle 100.

Motor vehicles that incorporate elements according to the present disclosure may include a variety of construction methodologies that are conventionally known, including the unibody construction methodology depicted in FIGS. 1-6 as well as a body-on-frame construction methodology. While the embodiments described and depicted herein make reference to unibody structures, it should be understood that vehicles that are constructed with body-on-frame construction may incorporate the elements that are shown and described herein.

Referring to FIGS. 2-6, the unibody 110 includes a pair of side supports 112 that are spaced apart from one another in the vehicle 100 in a vehicle lateral direction (i.e., in the +/− vehicle Y-direction depicted in FIGS. 1-6). For clarity, one side support 112 is depicted in FIGS. 2-6, however it should be understood that the description made herein may apply to both side supports 112 that are positioned along opposite sides of the vehicle 100.

The side support 112 extends in a vehicle longitudinal direction (i.e., in the +/− vehicle X-direction depicted in FIGS. 1-6). The side support 112 extends between at least the front suspension mount 116 and a rear suspension mount (not depicted) that is positioned rearward of the front suspension mount 116 in the vehicle longitudinal direction. In some embodiments, the front suspension mount 116 and the rear suspension mount are coupled to the side support 112.

The side support 112 may be integral with the unibody 110, such that the side support 112 is incorporated into the cabin 108. In other vehicle embodiments, such as embodiments exhibiting body-on-frame construction (not depicted), the side support 112 may be separately coupled to the cabin 108.

As used herein, the term "vehicle longitudinal direction" refers to the forward-rearward direction of the vehicle (i.e., in the +/− vehicle X-direction depicted in FIGS. 1-6), which corresponds to the direction between the front suspension mount 116 and the rear suspension mount. The term "vehicle lateral direction" refers to the cross-vehicle direction of the vehicle (i.e., in the +/− vehicle Y-direction depicted in FIGS. 1-6), and is transverse to the vehicle longitudinal direction. The term "vehicle vertical direction" refers to the vertical direction of the vehicle (i.e., in the +/− vehicle Z-direction depicted in FIGS. 1-6), and is transverse to the vehicle lateral and longitudinal directions. Further, the terms "inboard" and "outboard" are used to describe the relative positioning of various components of the vehicle. Referring to FIGS. 1-6, the term "outboard" as used herein refers to the relative location of a component in direction 12 with respect to a vehicle centerline 10. The term "inboard" as used herein refers to the relative location of a component in direction 14 with respect to the vehicle centerline 10. Because the vehicle may be generally symmetrical about the vehicle centerline 10, the use of terms "inboard" and "outboard" may be switched when evaluating components positioned along opposite sides of the vehicle 100.

Figure 5:
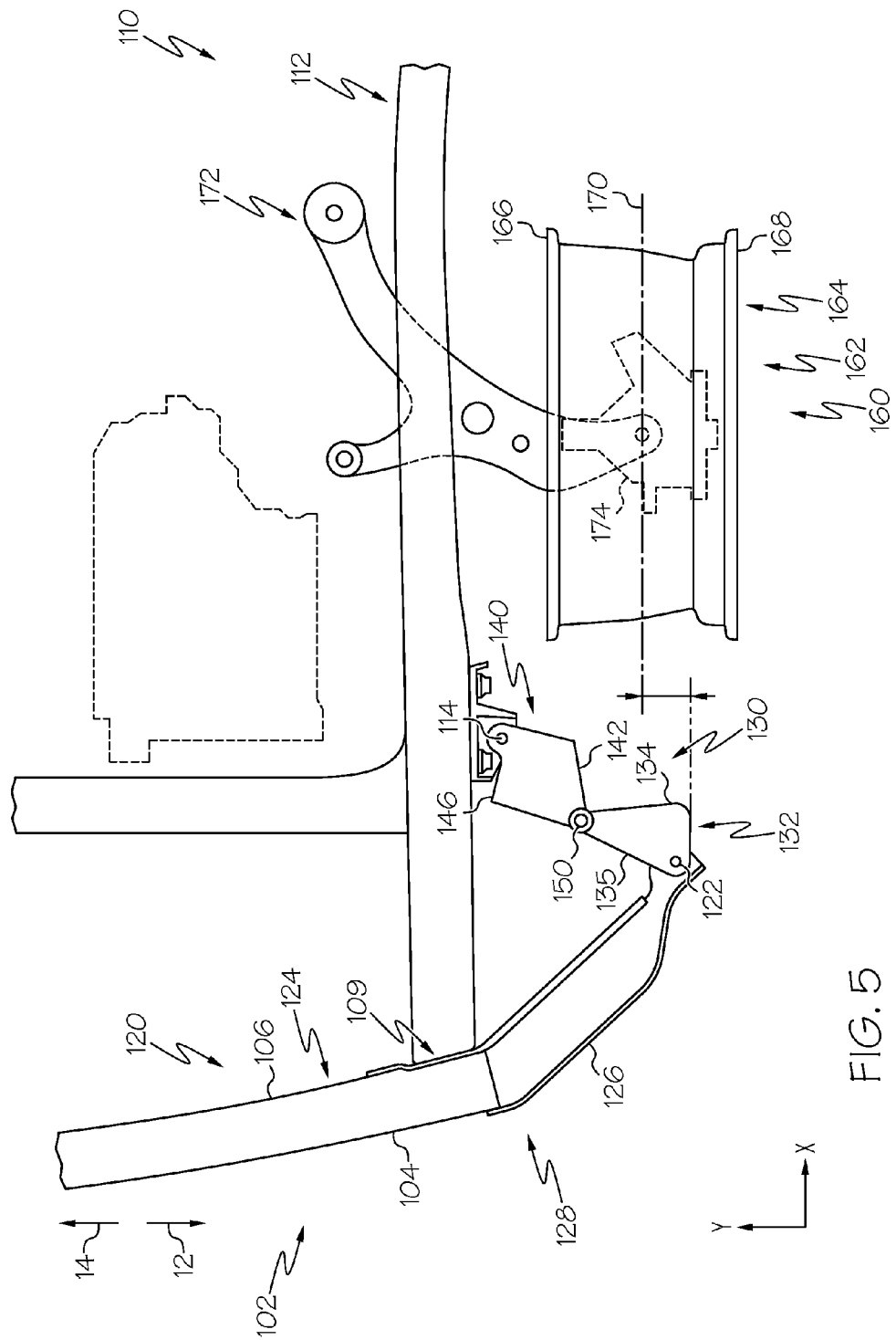
FIG. 5 schematically depicts a top view of a bumper assembly, a side support, a repositionable joint assembly, and a front suspension unit according to one or more embodiments shown or described herein.

Referring to FIGS. 1 and 5, front suspension units 160 are coupled to the front suspension mounts 112. For clarity, one front suspension unit 160 that is positioned along one side of the vehicle 100 is described and depicted. However, it should be understood that vehicle 100 may incorporate symmetrical suspension units that are positioned along opposite sides of the vehicle 100. The description of the vehicle structures may apply to both of the opposing sides of the vehicle 100.

Referring to FIGS. 1 and 5, as used herein, the front suspension unit 160 generally includes vehicle components that connect the unibody 110 to a wheel assembly 162. These components may include control arms, steering links, and a front chassis member including a spring, a strut, and/or a damper. The spring and the strut may be coupled to a knuckle assembly 172 that includes a hub 174. The wheel assembly 162 may be coupled to the hub 174. The wheel assembly 162 may generally include a tire 176 that is positioned around a rim 164.

Referring to FIG. 5, the rim 164 may include an inner flange 166 and an outer flange 168. With the rim 164 mounted to the hub 174, the inner flange 166 may be positioned inboard from the outer flange 168 in the vehicle lateral direction. A rim centerline 170 bisects the rim 164 between the inner flange 166 and the outer flange 168 in the vehicle lateral direction.

Referring to FIGS. 2-5, the vehicle 100 includes a front bumper 102. The front bumper 102 includes a bumper assembly 120 that is coupled to the pair of side supports 112. The bumper assembly 120 generally extends in the vehicle lateral direction and is transverse to the side supports 112. The bumper assembly 120 may be coupled to the side supports 112 by a variety of attachments methods including, for example and without limitation, a welded attachment, a brazed attachment, mechanical fasteners, and/or structural adhesives.

In embodiments, the bumper assembly 120 may include a main bumper portion 124 and bumper extension portions 126 that are coupled to the main bumper portion 124 at laterally outboard positions. In the depicted embodiments, one bumper extension portion 126 is described and depicted. However it should be understood that the description herein to the one of the bumper extension portions 126 may apply to both bumper extension portions 126 that are positioned along opposite sides of the vehicle 100.

The bumper extension portion 126 is coupled to the main bumper portion 124 at an outboard end 128 of the main bumper portion 124. In the depicted embodiment, the forward-facing side 104 of the main bumper portion 124 extends to a position outboard of the side support 112, while the rearward-facing side 106 of the main bumper portion 124 terminates at a position inboard of the side support 112. In this embodiment, the bumper extension portion 126 extends from the main bumper portion 124 so that the forward-facing side 104 of the bumper extension portion 126 is positioned outboard of the side support 112 and the rearward-facing side 104 of the bumper extension portion 126 extends in the inboard direction and in the outboard direction from the side support 112. In this embodiment, both the main bumper portion 124 and the bumper extension portion 126 are coupled to the side support 112 at location 109. In some embodiments (not shown), both the forward-facing side 104 of the main bumper portion 124 and the rearward-facing side 106 of the main bumper portion 124 may extend to a position outboard of the side support 112. In such embodiments, the main bumper portion 124 may be coupled to the side support 112 and the bumper extension portion 126 may be coupled to the main bumper portion 124 at positions outboard of the side support 112. In other embodiments (not shown), the main bumper portion 124 may terminate at a position inboard of the side support 112. In such embodiments, the bumper extension portion 126 may be coupled to the side support 112 and the bumper extension portion 126 may be coupled to the main bumper portion 124 at positions inboard of the side support 112. The bumper extension portion 126 may be coupled to the main bumper portion 124 at the location 109 by a variety of attachments including, for example and without limitation, welded joints, brazed joints, mechanical fasteners, and structural adhesives.

The bumper extension portion 126 may extend outboard of the side support 112, thereby increasing the width of the forward-facing impact energy absorption structures in the vehicle lateral direction. The bumper extension portion 126 may have a curved shape, as depicted in FIGS. 2-5, extending both laterally from the main bumper portion 124 in the vehicle lateral direction and rearward from the main bumper portion 124 in the vehicle longitudinal direction. Alternatively, the bumper extension portion 126 may have a generally straight shape such that the bumper extension portion 126 does not generally extend rearward from the main bumper portion 124. The bumper extension portion 126 may alternatively have any suitable shape that extends outboard from the main bumper portion 124. In other embodiments, the bumper extension portion 126 may include a front member and a rear member that are coupled to one another, as described in U.S. patent application Ser. No. 13/865,678, assigned to Toyota Motor Engineering and Manufacturing of North America, which is which is hereby incorporated by reference in its entirety.

Referring to FIGS. 2-5, a repositionable joint assembly 130 extends between the bumper assembly 120 and the side support 112. The repositionable joint assembly 130 includes an outboard linking member 132, an inboard linking member 140, and a fulcrum portion 150.

Referring to FIG. 2, the outboard linking member 132 is pivotally coupled to the bumper assembly 120 at a bumper securement location 122. The outboard linking member 132 is pivotally coupled to the bumper assembly 120 such that the outboard linking member 132 may rotate about axis 154. The axis 154 may be generally parallel to a vehicle vertical direction. The outboard linking member 132 may be pivotally coupled to the bumper assembly 120 through a variety of joining techniques, including, but not limited to, a pinned connection. The outboard linking member 132 may include a one piece construction having an integral hinge portion positioned proximate to the fulcrum portion 150 such that the outboard linking member 132 may be pivotally coupled to the inboard linking member 140 at the fulcrum portion 150. The outboard linking member 132 may transmit energy from a collision with the main bumper portion 124 and/or the bumper extension portion 126 to the side support 112 through the inboard linking member 140, as will be described in greater detail herein.

In some embodiments, the outboard linking member 132 may include a cross-sectional shape that provides high rigidity such that a substantial portion of energy introduced to the outboard linking member 132 is across the outboard linking member 132 and not directly absorbed by the outboard linking member 132. Alternatively, the outboard linking member 132 may have one of a variety of cross-sectional shapes that forms a reduced section modulus. The reduced section modulus of the outboard linking member 132 in these alternative embodiments may deform upon application of force from a collision such that the outboard linking member 132 absorbs at least a portion of the energy associated with the collision. Energy that is not absorbed by the outboard linking member 132 may be transferred across the outboard linking member 132.

As depicted in FIG. 2, the bumper securement location 122 may be positioned on the bumper extension portion 126. Alternatively, in other embodiments that are not depicted, the bumper securement location 122 may be positioned on the main bumper portion 124. In some embodiments, the bumper securement location 122 may be positioned outboard of the inner flange 166 of the rim 164 in the vehicle lateral direction, as depicted in FIG. 5. In some embodiments, the bumper securement location 122 may be positioned outboard of the rim centerline 170 in the vehicle lateral direction. By positioning the bumper securement location 122 outboard of the inner flange 166 and/or the rim centerline 170 in the vehicle lateral direction, the repositionable joint assembly 130 may be positioned such that energy associated with a small front bumper overlap collision is transferred from the main bumper portion 124 or the bumper extension portion 126 along the repositionable joint assembly 130 to direct energy into the side support 112. In particular, by positioning the bumper securement location 122 outboard of the inner flange 166 and/or the rim centerline 170, the repositionable joint assembly 130 may direct energy into the side support 112 in collision configurations where an impact occurs outboard of the inner flange 166 and/or the rim centerline 170. The repositionable joint assembly 130 may therefore avoid introducing all of the energy of a small front bumper overlap collision into the rim 164, and instead direct that energy into the side support 112.

Referring to FIG. 2, the inboard linking member 140 is pivotally coupled to the side support 112 at a side support securement location 114. The inboard linking member 140 is pivotally coupled to the side support 112 such that the inboard linking member 140 may rotate about axis 156. The axis 156 may be generally parallel to a vehicle vertical direction and axis 154 of the outboard linking member 132. The inboard linking member 140 may be pivotally coupled to the side support 112 through a variety of joining techniques, including, but not limited to, a pinned connection. As depicted in FIG. 2, the side support securement location 114 is positioned on the side support 112 at a location forward of the front suspension mount 116 as evaluated in the vehicle longitudinal direction.

The inboard linking member 140 may include a one piece construction having an integral hinge portion positioned proximate to the fulcrum portion 150 such that the inboard linking member 140 may be pivotally coupled to the outboard linking member 132 at the fulcrum portion 150. In some embodiments, the inboard linking member 140 may include a cross-sectional shape that provides high rigidity such that a substantial portion of energy introduced to the inboard linking member 140 is across the inboard linking member 140 and not directly absorbed by the inboard linking member 140. Alternatively, the inboard linking member 140 may have one of a variety of cross-sectional shapes that forms a reduced section modulus. The reduced section modulus of the inboard linking member 140 in these alternative embodiments may deform upon application of force from a collision such that the inboard linking member 140 absorbs at least a portion of the energy associated with the collision. Energy that is not absorbed by the inboard linking member 140 may be transferred across the inboard linking member 140.

The outboard linking member 132 is pivotally coupled to the inboard linking member 140 at the fulcrum portion 150. In the embodiment depicted in FIG. 2, the fulcrum portion 150 is positioned between the bumper securement location 122 and the side support securement location 114. In embodiments, the fulcrum portion 150 is positioned rearward of the bumper securement location 122 and forward of the side support securement location 114 in the vehicle longitudinal direction during ordinary vehicle operation. The fulcrum portion 150 may be generally oriented in the vehicle vertical direction, which is transverse to the vehicle longitudinal and lateral directions, and parallel to axis 154 of the outboard linking member 132 and axis 156 of the inboard linking member 140. Accordingly, the outboard linking member 132 may pivot about the fulcrum portion 150 with respect to the inboard linking member 140 about an axis 152 that is generally parallel to the vehicle vertical direction. The outboard linking member 132 may be pivotally coupled to the inboard linking member 140 at the fulcrum portion 150 through a variety of joining techniques, including, but not limited to a pinned connection.

Still referring to FIGS. 2-5, the outboard linking member 132 may include a first engagement surface 134. The first engagement surface 134 may be positioned proximate to the fulcrum portion 150. The first engagement surface 134 may have a variety of configurations, including being generally planar or generally contoured. In some embodiments, such as the embodiment depicted in FIG. 4, the first engagement surface 134 and a second engagement surface 142 of the inboard linking member 140 may have complementary and interlocking shapes and/or features. In particular, the first engagement surface 134 includes a first interlocking feature 139 that includes an extended portion 137 that extends from the first engagement surface 134. The second engagement surface 142 includes a second interlocking feature 145 that includes a recessed portion 143 that is complementary with and engagable with the first interlocking feature 139. Alternatively, the first interlocking feature 139 of the first engagement surface 134 may include a recessed portion that is engageable with an extended portion of the second interlocking feature 145 of the second engagement surface 142. In either instance, the first interlocking feature 139 and the second interlocking feature 145 may be shaped such that the first interlocking feature 139 and the second interlocking feature 145 engage one another as the outboard linking member 132 rotates toward the inboard linking member 140, and the first interlocking feature 139 and the second interlocking feature 145 resist separation of the outboard linking member 132 and the inboard linking member 140 once engaged.

The first engagement surface 134 may face in a generally rearward orientation relative to the vehicle longitudinal direction. The first engagement surface 134 may have a normal projection 16 that extends from the geometric center (i.e., the centroid) of the first engagement surface 134 in a direction that is normal to the first engagement surface 134 at the geometric center.

The inboard linking member 140 may include the second engagement surface 142. The second engagement surface 142 may be positioned proximate to the fulcrum portion 150. The second engagement surface 142 may have a variety of configurations, including being generally planar or generally contoured. In some embodiments, such as the embodiment depicted in FIG. 4, the second engagement surface 142 and the first engagement surface 134 of the outboard linking member 132 may have complementary and interlocking shapes and/or features. As described hereinabove, the second interlocking feature 145 of the second engagement surface 142 includes the recessed portion 143 that extends into the second engagement surface 142 and that is engagable with the extended portion 137 of the first interlocking feature 139 on the first engagement surface 134. Alternatively, the second engagement surface 142 may include an extended portion that is configured to engage a recessed portion of the first engagement surface 134. While the embodiment depicted in FIG. 4 includes a first interlocking feature 139 and a second interlocking feature 145, it should be understood that the outboard linking member 132 and the inboard linking member may include any suitable number of complementary interlocking features that include any suitable complementary and interlocking shapes and/or features.

The second engagement surface 142 may face in an orientation that generally faces the first engagement surface 134. The second engagement surface 142 may have a normal projection 18 that extends from the geometric center (i.e., the centroid) of the second engagement surface 142 in a direction that is normal to the second engagement surface 142 at the geometric center. The normal projection 16 of the first engagement surface 134 and the normal projection 18 of the second engagement surface 142 may be transverse to one another and, when evaluated in the vehicle vertical direction intersect one another at a position between the first engagement surface 134 and the second engagement surface 142. During ordinary vehicle operation, the first engagement surface 134 of the outboard linking member 132 may be spaced apart from the second engagement surface 142 of the inboard linking member 140.

Figure 4:
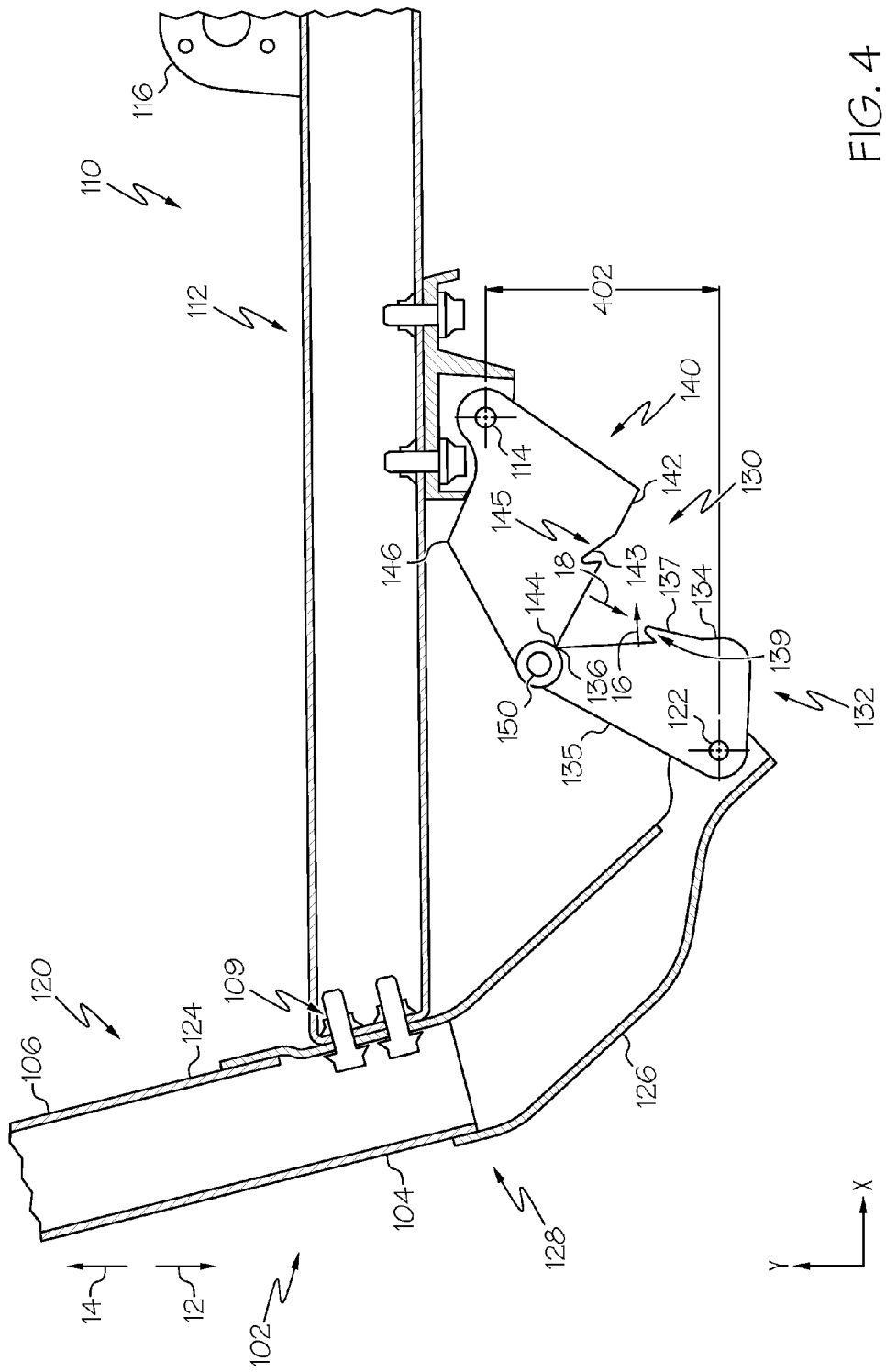
FIG. 4 schematically depicts a top view of a bumper assembly, a side support, and a repositionable joint assembly according to one or more embodiments shown or described herein.

Referring to FIG. 4, in embodiments, the first engagement surface 134 may have a trailing edge 136 that is positioned proximate to the fulcrum portion 150. The second engagement surface 142 may have a leading edge 144 that is positioned proximate to the fulcrum portion 150. The leading edge 144 of the second engagement surface 142 may be positioned rearward of the trailing edge 136 of the first engagement surface 134 in the vehicle longitudinal direction and/or inboard of the trailing edge 136 in the vehicle lateral direction.

The first engagement surface 134 and the second engagement surface 142, when evaluated in the vehicle vertical direction may form a general "v"-shape during ordinary vehicle operation. During a collision, the outboard linking member 132 and the inboard linking member 140 may rotate about the fulcrum portion 150 such that the first engagement surface 134 contacts the second engagement surface 142, thereby collapsing the v-shape between the first engagement surface 134 and the second engagement surface 142, as will be described in greater detail herein. In some alternative embodiments, a biasing member or other energy absorbent material may be positioned between the first engagement surface 134 and the second engagement surface 142. By positioning a biasing member or other energy absorbent material between the first engagement surface 134 and the second engagement surface 142, the biasing member or other energy absorbent material may absorb energy associated with a collision as the v-shape between the first engagement surface 134 and the second engagement surface 142 collapses.

The outboard linking member 132 may further include a leading surface 135 that faces in a generally forward orientation when the repositionable joint assembly 130 is positioned in the deactivated configuration. The leading surface 135 may be positioned to face opposite the direction of the first engagement surface 134.

The inboard linking member 140 may further include a side support engagement projection 146. The side support engagement projection 146 may be provided to decrease the distance between the side support 112 and the inboard linking member 140. The side support engagement projection 146 of the inboard linking member 140 may be positioned forward of the side support securement location 114. The side support engagement projection 146 may be spaced apart from the side support 112 and be at a minimum distance from the side support 112 during ordinary vehicle operation. The side support engagement projection 146 may reflect a position on the inboard linking member 140 that contacts the side support 112 in the event of a collision that deflects the repositionable joint assembly 130. During such a collision, the inboard linking member 140 may rotate about the side support securement location 114 so that the side support engagement projection 146 of the inboard linking member 140 contacts the side support 112. It should be understood that while the side support engagement projection 146 is depicted as a corner-shaped projection between the inboard linking member 140 and the side support 112, the side support engagement projection 146 may be any suitable shape. For example and without limitation, the side support engagement projection 146 may be generally rounded, and/or may include multiple side support engagement projections. Additionally, while the side support engagement projection 146 may be integrally formed with the inboard linking member 140, the side support engagement projection 146 may separately formed and coupled thereto. Additionally, the side support engagement projection 146 may include coatings and/or other materials that are suitable for absorbing impact energy.

When a vehicle is involved in a collision, vehicle structures may elastically and plastically deform while the vehicle slows from its previous operating speed. The elastic and plastic deformation of the vehicle structures may dissipate the energy of the vehicle. The vehicle structures may be designed to absorb and/or divert the energy associated with the collision so that the energy associated with the collision may be controllably dissipated through selective and preferential deformation of the vehicle structures. Through the selective and preferential deformation of the vehicle structures, the locations of energy dissipation can be targeted based on preferred criteria, including dissipating energy ahead of the passenger cabin.

A vehicle involved in a small front bumper overlap collision may have only a portion of the front bumper contact a barrier, for example less than about 25% of the width of the front bumper. In such small front bumper overlap collisions, some of the energy dissipation elements of the vehicle may not be initiated or may be partially initiated. For example, energy dissipation elements that are positioned along the opposite side of the vehicle from the location of the barrier collision may not be initiated or may be partially initiated. Instead, in small front bumper overlap collisions, the energy that is introduced to the vehicle structures may be non-symmetrical across the vehicle width. Accordingly, the response of the vehicle structures to the energy introduced by the small overlap collisions may introduce a non-symmetrical response to the vehicle structures. Referring to embodiments disclosed herein that are incorporated into vehicles that have a unibody construction, the structural members of the unibody, for example, may be non-symmetrically loaded when the vehicle is involved in a small front bumper overlap collision.

Because only a portion of the front bumper is struck by a barrier during a small front bumper overlap collision, energy absorbing structures associated with the front bumper may have a reduced effect on the dissipation of energy of the impact. Some of the energy absorbing structures associated with the front bumper of the vehicle may not be activated or may be only partially activated, such that a portion of the energy absorbing structure of the vehicle may not dissipate energy associated with the small front bumper overlap collision. Instead, the energy from the impact may be directed into the front suspension unit of the vehicle that is proximate to the barrier that the vehicle impacts.

Figure 6:
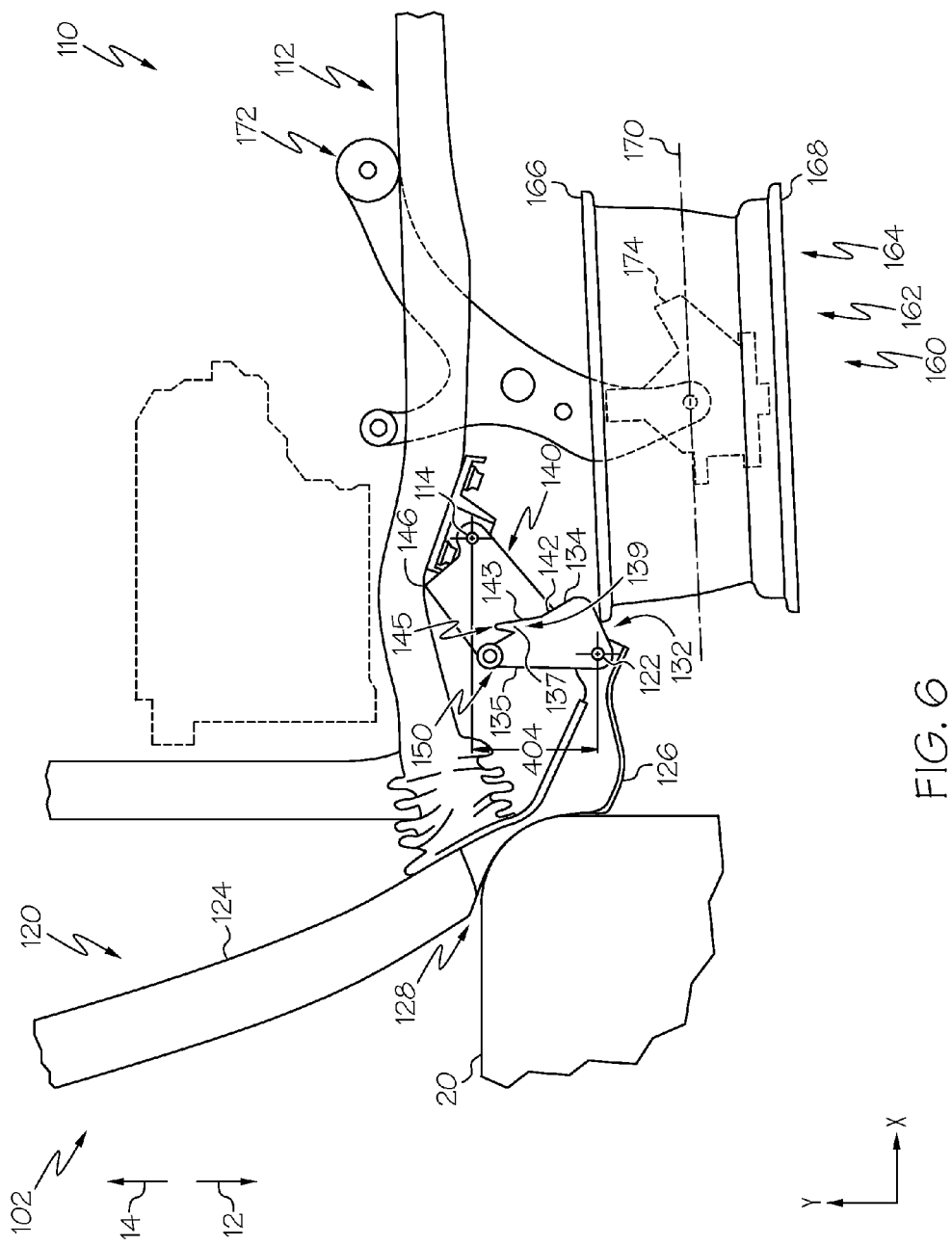
FIG. 6 schematically depicts a top view of a bumper assembly, side support, and a repositionable joint assembly under deformation after a small front bumper overlap collision according to one or more embodiments shown or described herein.

Referring to FIG. 6, the front bumper 102 of the vehicle 100 impacts a barrier 20 at a location proximate to the outboard end 128 of the main bumper portion 124. As the vehicle 100 impacts the barrier 20, the energy from the impact may cause the bumper assembly 120 to deform and to translate generally rearward in the vehicle longitudinal direction. In particular, the energy of the impact may plastically and elastically deform the bumper assembly 120 and translate the bumper assembly 120 generally rearward in the vehicle longitudinal direction.

As discussed hereinabove, the repositionable joint assembly 130 is nominally in the deactivated configuration, as shown in FIGS. 2-5, during ordinary vehicle operation of the vehicle 100. As the bumper assembly 120 deforms and translates rearward, the bumper assembly 120 may introduce a force into the repositionable joint assembly 130 that collapses the repositionable joint assembly 130 from a deactivated configuration, as depicted in FIGS. 2-5, to an activated configuration, as depicted in FIG. 6.

As discussed hereinabove, the first engagement surface 134 of the outboard linking member 132 and the second engagement surface 142 of the inboard linking member 140 may be spaced apart from one another during ordinary vehicle operation and in which the repositionable joint assembly 130 is in the deactivated configuration. In the deactivated configuration, the first interlocking feature 139 and the second interlocking feature 145 are spaced apart from one another. The rearward translation of the bumper assembly 120 may cause the outboard linking member 132 and the inboard linking member 140 to rotate relative to one another about the fulcrum portion 150 and relative to the surrounding vehicle structure. The outboard linking member 132 may rotate about the bumper securement location 122 and the fulcrum portion 150. The inboard linking member 140 may rotate about the side support securement location 114 and the fulcrum portion 150. The outboard linking member 132 and the inboard linking member 140 may rotate such that the first engagement surface 134 of the outboard linking member 132 and the second engagement surface 142 of the inboard linking member 140 approach one another.

As the outboard linking member 132 and the inboard linking member 140 rotate about the fulcrum portion 150, the distance between the first engagement surface 134 and the second engagement surface 142 decreases until the first engagement surface 134 engages the second engagement surface 142 through contact and the repositionable joint assembly 130 is in an activated configuration, as depicted in FIG. 6. Through the engagement of the first engagement surface 134 and the second engagement surface 142, the outboard linking member 132 and the inboard linking member 140 may form a generally rigid connection between the bumper assembly 120 and the side support 112.

As described hereinabove, the first engagement surface 134 and the second engagement surface 142 may include the first interlocking feature 139 and the second interlocking feature 145, respectively. In embodiments where the first engagement surface 134 includes the extended portion 137 and the second engagement surface 142 includes the recessed portion 143, when the first engagement surface 134 and the second engagement surface 142 rotate towards and contact one another, the extended portion 137 of the first interlocking feature 139 and the recessed portion 143 of the second interlocking feature 145 may engage one another and lock together. As the extended portion 137 and the recessed portion 143 lock together when the repositionable joint assembly 130 is in the activated configuration, the extended portion 137 and the recessed portion 143 may resist separation of the outboard linking member 132 and the inboard linking member 140, such that the outboard linking member 132 and the inboard linking member 140 may form and retain a generally rigid connection between the bumper assembly 120 and the side support 112. By retaining a generally rigid connection between the bumper assembly 120 and the side support 112, the extended portion 137 and the recessed portion 143 may assist in transmitting energy associated with the collision between the bumper assembly 120 and the side support 112, as will be described in greater detail herein.

As discussed hereinabove with respect to the depicted embodiments, the inboard linking member 140 may include the side support engagement projection 146 that is positioned forward of the side support securement location 114. As the inboard linking member 140 rotates about the side support securement location 114 and the fulcrum portion 150, the distance between the side support engagement projection 146 and the side support 112 decreases until the side support engagement projection 146 engages the side support 112 as the side support engagement projection 146 is proximate to the side support 112. In some impact configurations, the side support engagement projection 146 will engage the side support 112 and the first engagement surface 134 will engage the second engagement surface 142 simultaneously. In other collision configurations, the side support engagement projection 146 will engage the side support 112 prior in time to the first engagement surface 134 engaging the second engagement surface 142, or vice versa. Through the engagement of the side support engagement projection 146 and the side support 112, the inboard linking member 140 forms a relatively rigid connection with the side support 112 at the side support securement location 114 and the side support engagement projection 146.

Because the first engagement surface 134 and the second engagement surface 142 form a relatively rigid connection between the bumper assembly 120 and the side support 112, energy from the impact may be transferred from the bumper assembly 120 to the side support 112. The energy from the impact may be transferred through the inboard linking member 140 to the side support 112 through the side support securement location 114 and the side support engagement projection 146. Because energy from the impact may be transferred from the bumper assembly 120 to the side support 112, the amount of energy from the impact that is directed into the front suspension unit 160 may be reduced.

Further, in embodiments in which the bumper securement location 122 is positioned outboard of the inner flange 166 and/or the rim centerline 170 of the rim 164, a substantial portion energy from a collision with a barrier that is positioned outboard of the inner flange 166 and/or the rim centerline 170 of the rim 164 may be transferred from the bumper assembly 120 to the side support 112.

As described hereinabove, the first engagement surface 134 is spaced apart from the second engagement surface 142 during ordinary vehicle operation of the vehicle 100. As also described hereinabove, when the repositionable joint assembly 130 is in the activated configuration, the first engagement surface 134 contacts the second engagement surface 142 to form a relatively rigid connection between the bumper assembly 120 and the side support 112. Because the first engagement surface 134 is initially spaced apart from the second engagement surface 142, the repositionable joint assembly 130 does not form a rigid connection between the bumper assembly 120 and the side support 112 until the repositionable joint assembly 130 is in the activated configuration, as depicted in FIG. 6. Accordingly, the repositionable joint assembly 130 may not initially transfer energy from a small front bumper overlap collision from the bumper assembly 120 to the side support 112. Instead, energy associated with the small front bumper overlap collision may first reposition the repositionable joint assembly 130 from the deactivated configuration (as depicted in FIGS. 2-5) into the activated configuration (as depicted in FIG. 6). Subsequent to positioning the repositionable joint assembly 130 into the activated configuration, the repositionable joint assembly may transfer a substantial portion of the energy of the small front bumper overlap collision into the side support 112.

Collapsing the repositionable joint assembly 130 from the deactivated configuration (as depicted in FIGS. 2-5) to the activated configuration (as depicted in FIG. 6) may modify an effective width of the repositionable joint assembly 130. The repositionable joint assembly 130 may have an effective width 402 in the deactivated configuration, as shown in FIG. 4. The repositionable joint assembly 130 may have an effective width 404 in the activated configuration, as shown in FIG. 6. In embodiments, the effective width 402 in the deactivated configuration may be greater that the effective width 404 in the activated configuration.

Referring collectively to FIGS. 2-6, the leading surface 135 of the outboard linking member 132 pivots with rotation of the outboard linking member 132. The leading surface 135 is positioned relative to the fulcrum portion 150 to pivot into a more-oblique orientation relative to the vehicle longitudinal orientation when the repositionable joint assembly 130 is positioned in the activated configuration (as depicted in FIG. 6) than when the repositionable joint assembly 130 is positioned in the deactivated configuration (as depicted in FIGS. 2-5). A more oblique orientation between the leading surface 135 of the outboard linking member 132 and the vehicle longitudinal direction may present a structural configuration that dissipates increased energy in the vehicle longitudinal direction that is introduced to the bumper assembly 120 by the impacting barrier. A more oblique orientation between the leading surface 135 of the outboard linking member 132 and the vehicle longitudinal direction may also reduce the propensity of the vehicle 100 to slide in a direction generally parallel to the leading surface 135 and away from a direction in which the vehicle structures dissipate energy associated with the collision.

Because the repositionable joint assembly 130 may not transfer energy from the bumper assembly 120 to the side support 112 until the first engagement surface 134 is in contact with the second engagement surface 142, there may be a delay in time between the initial collision of the vehicle 100 with the barrier 20 and the transfer of energy from the bumper assembly 120 to the side support 112. The delay in time between the initial collision of the vehicle 100 with the barrier 20 and the transfer of energy from the bumper assembly 120 to the side support 112 may coincide with the amount of time that elapses as the repositionable joint assembly 130 is repositioned from the deactivated configuration into the activated configuration. The delay in time between the initial collision of the vehicle 100 with the barrier 20 and the transfer of energy from the bumper assembly 120 to the side support 112 may allow inertial sensors (not depicted) that are positioned on the vehicle to detect that a collision of the vehicle and a barrier has occurred before energy is transferred from the bumper assembly 120 to the side support 112.

The vehicle may also include an electronic controller having a processor and a non-volatile memory storing a computer readable instruction set. The electronic controller may be electronically coupled to the inertial sensors. The delay in time may also allow the electronic controller to execute the computer readable instruction set. The computer readable instruction set may command vehicle actuators to respond based on the detection of the collision by the inertial sensors.

For example, in some embodiments, the vehicle 100 may include one or more inertial sensors that are coupled to the unibody 110 of the vehicle 100. The inertial sensors may measure lateral and longitudinal acceleration of the vehicle 100. Because the inertial sensors are coupled to the unibody 110, when the unibody 110 of the vehicle decelerates, such as when the vehicle 100 collides with the barrier 20, the inertial sensors may correspondingly decelerate. If the deceleration of the inertial sensors exceeds a pre-determined threshold value, the electronic controller to which the inertial sensors are coupled, may determine that a collision between the vehicle 100 and a barrier 20 has occurred. The electronic controller may then command actuation of various vehicle actuators based on the detection of a collision. For example, the electronic controller may command the actuation of various supplemental restraint devices that are positioned within the cabin 108 of the vehicle 100 and proximate to the vehicle occupants.

Because of the delay in time between the detection of the collision by the inertial sensors and time at which the repositionable joint assembly 130 is repositioned from the deactivated configuration and into the activated configuration, and at which time energy associated with the collision is transferred in substantial portion to the side support 112, the electronic controller may therefore actuate the various vehicle actuators earlier in time as compared to when the energy of the collision is transferred to the side support 112. Therefore, the various vehicle actuators may be commanded to actuate at a comparatively earlier time relative to the introduction of energy to the side support 112.

As described hereinabove, when the vehicle 100 is involved in a small overlap collision, the energy absorbing structures of the vehicle may not be activated or may be only partially activated. Because the energy absorbing structures of the vehicle may not be activated or may be only partially activated, the unibody 110 may be non-symmetrically loaded when the vehicle is involved in a small overlap collision. As the unibody 110 may be non-symmetrically loaded, different portions of the unibody 110 may decelerate at different rates. For example, in some impact configurations, energy from a collision may be directed into the cabin 108 of the vehicle 100 at a time earlier in the collision event than energy from the collision is directed into the portion of the unibody 110 that is coupled to the inertial sensors. Accordingly, in such vehicle and impact configurations, the vehicle inertial sensors may not detect a deceleration indicative of a collision until a time later than had the vehicle impacted the barrier across the entire width of the bumper assembly 120. Further, the inertial sensors may not detect a deceleration indicative of a collision until after a substantial portion of the energy from the impact has been introduced to the side support 112 of the vehicle and towards the cabin 108 of the vehicle 100. Accordingly, devices controlled by the inertial sensors may not be deployed, or may be deployed after the cabin 108 has decelerated.

By delaying the introduction of energy from a collision into the side support 112 from the bumper assembly 120 until the repositionable joint assembly 130 is in the activated configuration, the repositionable joint assembly 130 may delay the introduction of energy into the side support 112 and toward the cabin 108 during a small front bumper overlap collision. By delaying the transfer of energy from the bumper assembly 120 into the side support 112, the repositionable joint assembly 130 may allow the inertial sensors to decelerate and thereby detect that a collision of the vehicle has occurred before a substantial portion of the energy of the collision is directed into the side support 112 by the repositionable joint assembly 130. Accordingly, the repositionable joint assembly 130 may allow the electronic controller to deploy various vehicle actuators, for example supplemental restraint devices, based on detection of a collision by the inertial actuators before a substantial portion of the energy of the collision is transferred into the side support 112 from the bumper assembly 120 during a small front bumper overlap collision.

Further, the timing delay of the introduction of energy from the bumper assembly 120 to the side support 112 from a small front bumper overlap collision may be modified based on the relative positioning of the configuration of the outboard linking member 132 and the inboard linking member 140. By modifying the timing delay between the time of the collision and the time of the introduction of energy from the bumper assembly 120 to the side support 112, the timing delay may be configured to correspond to detection and reaction time of the inertial sensors and the electronic controller. The timing delay between the collision and the introduction of energy from the bumper assembly 120 to the side support 112 may be extended by increasing the initial distance between the first engagement surface 134 and the second engagement surface 142 while the repositionable joint assembly 130 is in the deactivated configuration. Conversely, the timing delay between the collision and the introduction of energy from the bumper assembly 120 to the side support 112 may be reduced by decreasing the initial distance between the first engagement surface 134 and the second engagement surface 142 while the repositionable joint assembly 130 is in the deactivated configuration.

Figure 7:
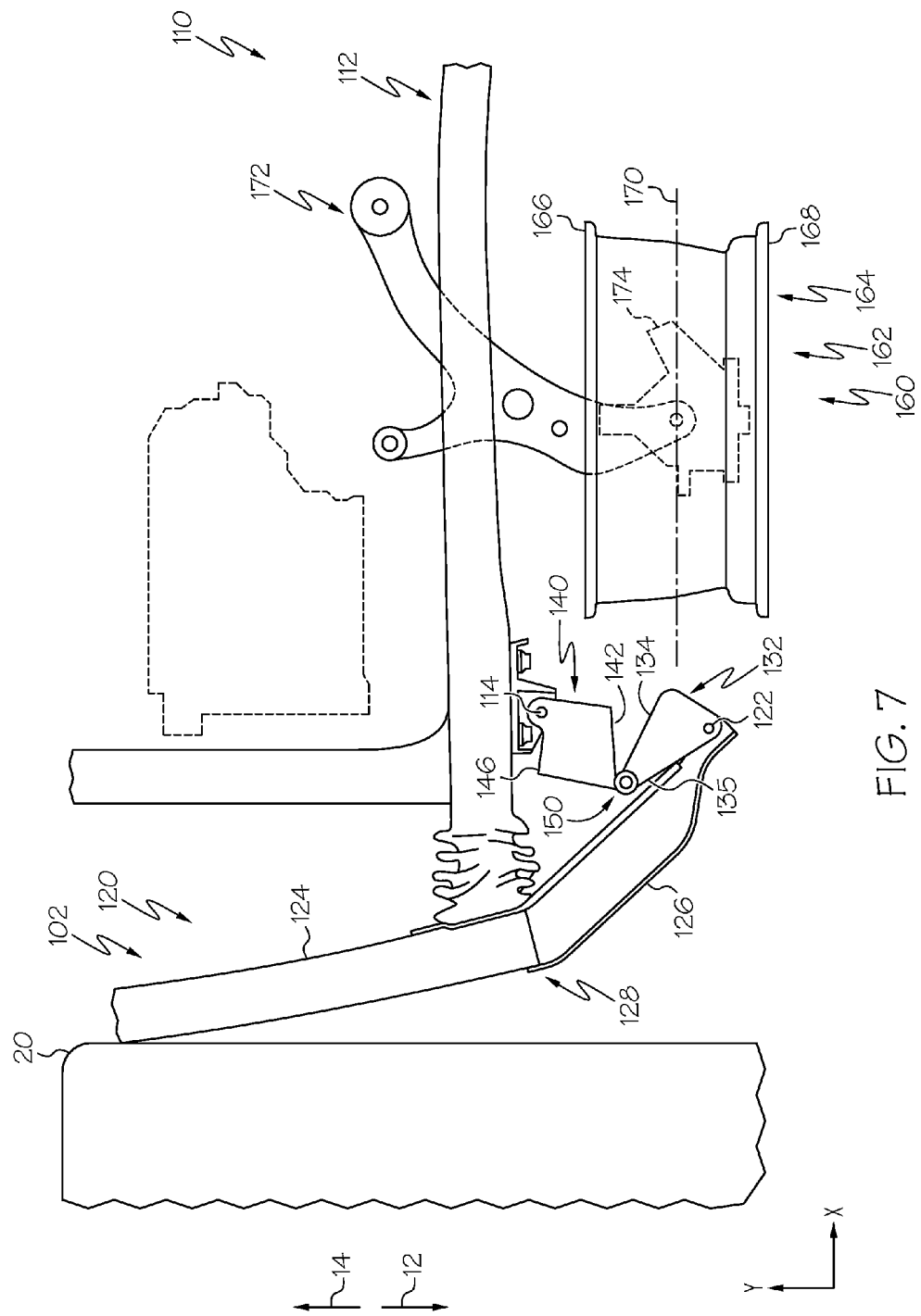
FIG. 7 schematically depicts a top view of a bumper assembly, side support, and a repositionable joint assembly under deformation after a partial/full front bumper overlap collision according to one or more embodiments shown or described herein.

Referring to FIG. 7, a vehicle 100 is depicted in a partial/full overlap collision (i.e., a collision with a barrier that overlaps more than 25% of the width of the bumper). In a partial/full overlap collision, many of the energy dissipation elements of the vehicle that were not initiated or were only partially initiated during a small front bumper overlap collision may be initiated. Similar to the small front bumper overlap collision depicted in FIG. 6, energy of the impact may plastically and elastically deform the bumper assembly 120 and translate the bumper assembly 120 generally rearward in the vehicle longitudinal direction. However, in contrast to a small front bumper overlap collision where a small portion of the bumper assembly 120 proximate to the barrier 20 is deformed and translated rearward, a substantial portion of the bumper assembly 120 may be deformed and translated rearward in a partial/full overlap collision.

Similar to a small front bumper overlap collision, as the bumper assembly 120 is deformed and translated rearward in the vehicle longitudinal direction, the repositionable joint assembly 130 is repositioned out of the deactivated configuration. More specifically, as the bumper assembly 120 is deformed and translated rearward, the outboard linking member 132 and the inboard linking member 140 rotate about the fulcrum portion 150, and the distance between the first engagement surface 134 and the second engagement surface 142 decreases. However, in a partial/full overlap collision, a substantial amount of energy associated with the collision may be directed into the energy absorbing structures of the vehicle, such as the side support 112. Accordingly, while the repositionable joint assembly 130 may be repositioned outside of the deactivated configuration, in some partial/full overlap collisions, the repositionable joint assembly 130 may not be fully repositioned into the activated configuration, as depicted in FIG. 7. In other partial/full overlap collisions, the repositionable joint assembly 130 may be fully repositioned into the activated configuration, similar the small front bumper overlap collision depicted in FIG. 6.

As described hereinabove, the first engagement surface 134 is spaced apart from the second engagement surface 142 during ordinary vehicle operation of the vehicle 100. Because the first engagement surface 134 is initially spaced apart from the second engagement surface 142, the repositionable joint assembly 130 may not initially transfer energy from a partial/full overlap collision from the bumper assembly 120 to the side support 112. Instead, there may be a delay in time between the initial collision of the vehicle 100 with the barrier 20 and the transfer of energy from the bumper assembly 120 to the side support 112. The delay in time between the initial collision and the transfer of energy from the bumper assembly 120 to the side support 112 may coincide with the amount of time that elapses as the repositionable joint assembly 130 is repositioned from the deactivated configuration into the activated configuration. The delay in time may allow inertial sensors that are positioned on the vehicle to detect that a collision of the vehicle and a barrier has occurred before energy is transferred from the bumper assembly 120 to the side support 112 through the repositionable joint assembly 130.

In some partial/full overlap collisions, such as the collision depicted in FIG. 7, the repositionable joint assembly 130 may not be fully repositioned into the activated configuration, and accordingly, energy may not be transferred between the bumper assembly 120 and the side support 112 through the repositionable joint assembly 130. In a partial/full overlap collision where the repositionable joint assembly 130 is not fully repositioned into the activated configuration, the inertial sensors may detect that a collision of the vehicle with the barrier has occurred without energy being transferred between the bumper assembly 120 and the side support 112 through the repositionable joint assembly 130. The repositionable joint assembly 130 may therefore allow the electronic controller to deploy supplemental restraint devices before and/or without transferring energy from the bumper assembly 120 to the side support 112 through the repositionable joint assembly 130.

Figure 8:
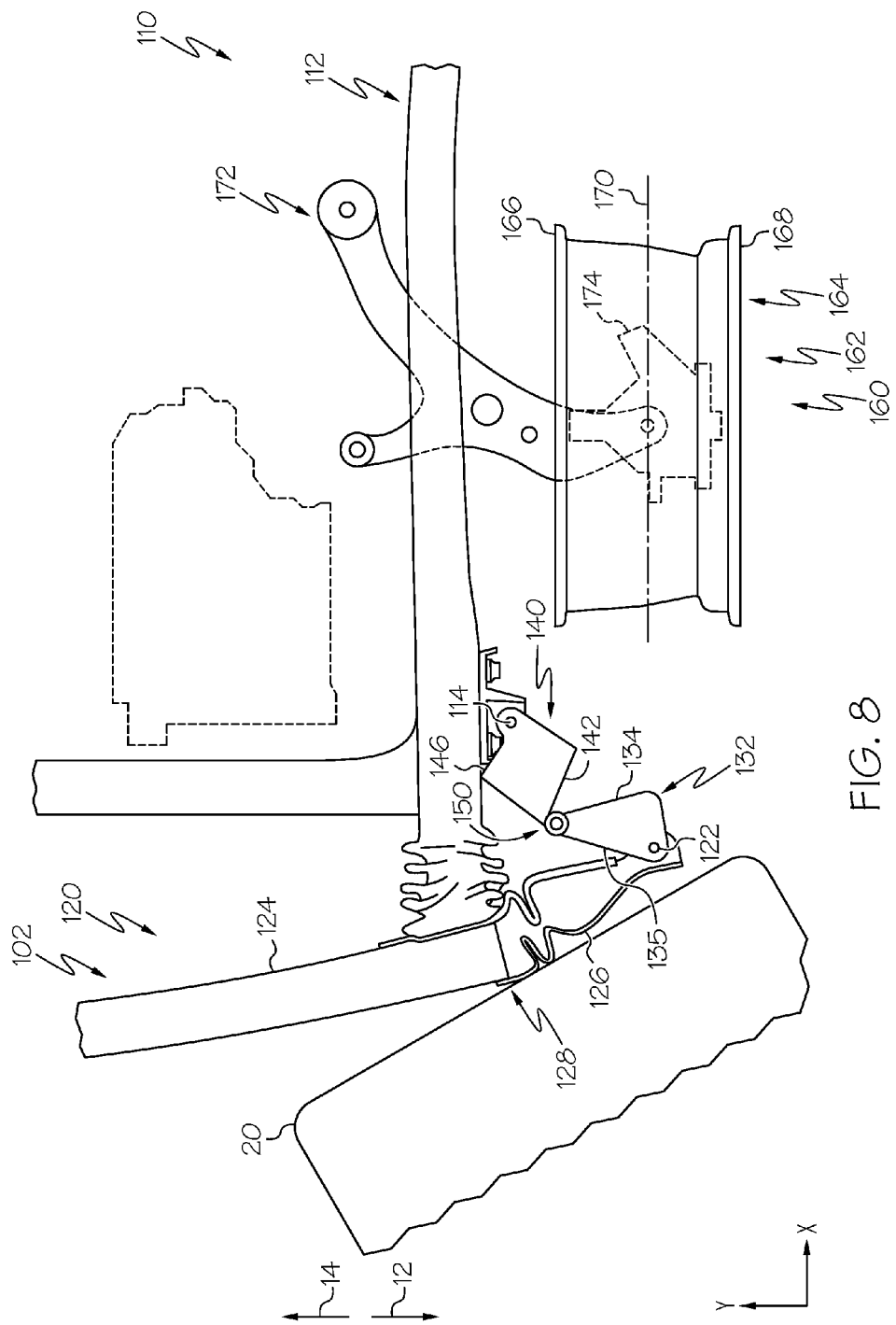
FIG. 8 schematically depicts a top view of a bumper assembly, side support, and a repositionable joint assembly under deformation after an angled barrier collision according to one or more embodiments shown or described herein.

Referring to FIG. 8, vehicle 100 is depicted in an angled barrier collision (i.e., a collision with a barrier that is positioned at an angle with respect to the bumper assembly). In an angled barrier collision, many of the energy dissipation elements of the vehicle that were not initiated or were only partially initiated during a small front bumper overlap collision may be initiated. Similar to the small front bumper overlap collision depicted in FIG. 6, energy of the impact may plastically and elastically deform the bumper assembly 120 and translate the bumper assembly 120 generally rearward in the vehicle longitudinal direction.

Similar to a small front bumper overlap collision, as the bumper assembly 120 is deformed and translated rearward in the vehicle longitudinal direction, the repositionable joint assembly 130 is repositioned out of the deactivated configuration. More specifically, as the bumper assembly 120 is deformed and translated rearward, the outboard linking member 132 and the inboard linking member 140 rotate about the fulcrum portion 150, and the distance between the first engagement surface 134 and the second engagement surface 142 decreases. However, in an angled barrier collision, a substantial amount of energy associated with the collision may be directed into the energy absorbing structures, such as the side support 112. Because a substantial amount of the energy associated with the collision are directed into the energy absorbing structures of the vehicle, the energy absorbing structures of the vehicle may elastically and plastically deform, thus absorbing a substantial portion of the energy associated with the collision. Because the energy absorbing structures of the vehicle may absorb a substantial portion of the energy associated with the collision, the bumper assembly 120 proximate to the repositionable joint assembly 130 may not translate as far rearward during an angled barrier collision as compared to a small front bumper overlap collision. As the bumper assembly 120 does not translate as far rearward, the first engagement surface 134 may not be brought into contact with the second engagement surface 142. Accordingly, while the repositionable joint assembly 130 may be repositioned outside of the deactivated configuration, in some angled barrier collisions, the repositionable joint assembly 130 may not be repositioned into the activated configuration, as depicted in FIG. 8. In other angled barrier collisions, the repositionable joint assembly 130 may be fully repositioned into the activated configuration, similar the small front bumper overlap collision depicted in FIG. 6.

As described hereinabove, the first engagement surface 134 is spaced apart from the second engagement surface 142 during ordinary vehicle operation of the vehicle 100. Because the first engagement surface 134 is initially spaced apart from the second engagement surface 142, the repositionable joint assembly 130 may not initially transfer energy from an angled barrier collision from the bumper assembly 120 to the side support 112. Instead, there may be a delay in time between the initial collision of the vehicle 100 with the barrier 20 and the transfer of energy from the bumper assembly 120 to the side support 112. The delay in time between the initial collision and the transfer of energy from the bumper assembly 120 to the side support 112 may coincide with the amount of time that elapses as the repositionable joint assembly 130 is repositioned from the deactivated configuration into the activated configuration. The delay in time may allow inertial sensors that are positioned on the vehicle to detect that a collision of the vehicle and a barrier has occurred before energy is transferred from the bumper assembly 120 to the side support 112 through the repositionable joint assembly 130.

In some angled barrier collisions, such as the collision depicted in FIG. 8, the repositionable joint assembly 130 may not be fully repositioned into the activated configuration, and accordingly, energy may not be transferred between the bumper assembly 120 and the side support 112 through the repositionable joint assembly 130. In an angled barrier collision where the repositionable joint assembly 130 is not fully repositioned into the activated configuration, the inertial sensors may detect that a collision of the vehicle with the barrier has occurred without energy being transferred between the bumper assembly 120 and the side support 112 through the repositionable joint assembly 130. The repositionable joint assembly 130 may therefore allow the electronic controller to deploy supplemental restraint devices before and/or without transferring energy from the bumper assembly 120 to the side support 112 through the repositionable joint assembly 130.

The distance between the first engagement surface 134 and the second engagement surface 142 may be increased or decreased, for example by altering the size and/or shape of the outboard linking member 132 and the inboard linking member 140. Similarly, the distance between the first engagement surface 134 and the second engagement surface 142 in the deactivated configuration may be increased or decreased through the relative positioning of the fulcrum portion 150 with respect to the bumper securement location 122 and the side support securement location 114 in the vehicle longitudinal direction and the vehicle lateral direction.

It should now be understood that vehicles according to the present disclosure include a repositionable joint assembly that extends between and is pivotally coupled to the side support and the bumper assembly. The repositionable joint assembly includes an outboard linking member pivotally coupled to the bumper assembly at a bumper securement location and an inboard linking member pivotally coupled to the side support at a side support securement location. The outboard linking member and the inboard linking member are pivotally coupled to one another at a fulcrum portion. Through the repositionable joint assembly, energy from a collision may be transferred from the bumper assembly to the side support, and the repositionable joint assembly may delay the introduction of energy to the side support after the initial impact of the collision. Subsequent to being repositioned into an activated configuration, the repositionable joint assembly may transfer a substantial portion of the energy of the small front bumper overlap collision to the side member.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
   a side support extending in a vehicle longitudinal direction;
   a bumper assembly coupled to the side support and extending in a vehicle lateral direction that is transverse to the vehicle longitudinal direction; and
   a repositionable joint assembly extending between and pivotally coupled to the side support and the bumper assembly, the repositionable joint assembly comprising:
      an outboard linking member coupled to the bumper assembly at a bumper securement location, the outboard linking member comprising a first interlocking feature;
      an inboard linking member coupled to the side support at a side support securement location and pivotally coupled to the outboard linking member, the inboard linking member comprising a second interlocking feature that is complementary with the first interlocking feature.

2. The vehicle of claim 1, wherein the repositionable joint assembly is repositionable between a deactivated configuration in which the first interlocking feature is spaced apart from the second interlocking feature, and an activated configuration in which the first interlocking feature and the second interlocking feature are engaged and lock together.

3. The vehicle of claim 1, wherein the outboard linking member is pivotally coupled to the bumper assembly.

4. The vehicle of claim 1, wherein the inboard linking member is pivotally coupled to the side support.

5. The vehicle of claim 1, wherein the first interlocking feature comprises an extended portion.

6. The vehicle of claim 1, wherein the second interlocking feature comprises a recessed portion.

7. The vehicle of claim 1, wherein:
   the inboard linking member further comprises a side support engagement projection that is positioned proximate to the side support securement location; and
   the repositionable joint assembly is repositionable between a deactivated configuration in which a first engagement surface of the outboard linking member and a second engagement surface of the inboard linking member are spaced apart from one another and the side support engagement projection and the side support are spaced apart from one another, and an activated configuration in which the first engagement surface and the second engagement surface contact one another and the side support engagement projection and the side support contact one another.

8. The vehicle of claim 1, wherein the inboard linking member comprises a side support engagement projection that is positioned forward of the side support securement location in the vehicle longitudinal direction and that is spaced apart from the side support during ordinary vehicle operation.

9. The vehicle of claim 1, further comprising a fulcrum portion, wherein the outboard linking member is pivotally coupled to the inboard linking member at the fulcrum portion.

10. A vehicle comprising:
    a side support extending in a vehicle longitudinal direction;
    a bumper assembly coupled to the side support and extending in a vehicle lateral direction that is transverse to the vehicle longitudinal direction; and
    a repositionable joint assembly extending between and coupled to the side support and the bumper assembly, wherein the repositionable joint assembly is repositionable between an activated configuration and a deactivated configuration, the repositionable joint assembly comprising:
- an outboard linking member coupled to the bumper assembly at a bumper securement location, the outboard linking member comprising a first engagement surface comprising a first interlocking feature;
- an inboard linking member coupled to the side support at a side support securement location, the inboard linking member comprising a second engagement surface comprising a second interlocking feature; and
- a fulcrum portion, wherein the outboard linking member is pivotally coupled to the inboard linking member at the fulcrum portion,
- wherein a distance between the first engagement surface and the second engagement surface in the deactivated configuration is greater than a distance between the first engagement surface and the second engagement surface in the activated configuration.

11. The vehicle of claim 10, wherein the inboard linking member comprises a side support engagement projection positioned forward of the side support securement location in the vehicle longitudinal direction, wherein the side support engagement projection is spaced apart from the side support when the repositionable joint assembly is positioned in the deactivated configuration and the side support engagement projection is in contact with the side support when the repositionable joint assembly is positioned in the activated configuration.

12. The vehicle of claim 10, wherein in the deactivated configuration, the first interlocking feature is spaced apart from the second interlocking feature and in the activated configuration the first interlocking feature and the second interlocking feature are engaged and lock together.

13. The vehicle of claim 10, wherein the outboard linking member is pivotally coupled to the bumper assembly.

14. The vehicle of claim 10, wherein the inboard linking member is pivotally coupled to the side support.

15. The vehicle of claim 10, wherein the first interlocking feature comprises an extended portion.

16. The vehicle of claim 10, wherein the second interlocking feature comprises a recessed portion.

17. A method for transferring energy between a bumper assembly and a side support of a vehicle, the method comprising:
- providing a repositionable joint assembly that extends between and is coupled to the side support and the bumper assembly, wherein the repositionable joint assembly comprises an outboard linking member coupled to the bumper assembly and an inboard linking member coupled to the side support and pivotally coupled to the outboard linking member;
- translating the bumper assembly rearward in a vehicle longitudinal direction;
- rotating the outboard linking member and the inboard linking member with respect to one another such that a first engagement surface of the outboard linking member contacts a second engagement surface of the inboard linking member;
- locking the outboard linking member and the inboard linking member together such that the outboard linking member and the inboard linking member form a connection between the bumper assembly and the side support.

18. The method of claim 17, wherein locking the outboard linking member to the inboard linking member comprises engaging an extended portion of the first engagement surface and a recessed portion of the second engagement surface.

19. The method of claim 17, wherein the outboard linking member is pivotally coupled to the bumper assembly and the method further comprises rotating the outboard linking member with respect to the bumper assembly.

20. The method of claim 17, wherein the inboard linking member is pivotally coupled to the side support and the method further comprises rotating the inboard linking member with respect to the side support.

* * * * *